(12) United States Patent
Steden et al.

(10) Patent No.: US 8,147,970 B2
(45) Date of Patent: Apr. 3, 2012

(54) ANTI-SCRATCH COATING, PROCEDURE FOR ITS PRODUCTION AND USE OF SAME

(75) Inventors: Folker Steden, Dresden (DE); Jorg Hinrich Fechner, Mainz (DE)

(73) Assignee: Schott AG, Mainz (DE)

( * ) Notice: Subject to any disclaimer, the term of this patent is extended or adjusted under 35 U.S.C. 154(b) by 144 days.

(21) Appl. No.: 12/339,288

(22) Filed: Dec. 19, 2008

(65) Prior Publication Data

US 2009/0202841 A1     Aug. 13, 2009

(30) Foreign Application Priority Data

Feb. 12, 2008   (DE) .......................... 10 2008 008 593
Dec. 19, 2008   (EP) ..................................... 08022086

(51) Int. Cl.
 B32B 17/06     (2006.01)
 C11D 7/32      (2006.01)
 C11D 3/37      (2006.01)
(52) U.S. Cl. ........ 428/426; 510/163; 510/180; 510/181; 510/201; 510/203
(58) Field of Classification Search .................. 428/426; 510/163, 180, 181, 201, 203
 See application file for complete search history.

(56) References Cited

U.S. PATENT DOCUMENTS

| 4,071,645 | A  | * | 1/1978  | Kahn ............................ 427/340 |
| 7,897,554 | B2 |   | 3/2011  | Kessler et al. |
| 2002/0108640 | A1 |   | 8/2002  | Barger et al. |
| 2003/0228470 | A1 |   | 12/2003 | Allaire et al. |
| 2008/0015133 | A1 |   | 1/2008  | Rigley et al. |

FOREIGN PATENT DOCUMENTS

| EP | 0 987 317    | 3/2000 |
| WO | 2007/057158  | 5/2007 |
| WO | 2007/068939  | 6/2007 |
| WO | 2008/068061  | 6/2008 |

OTHER PUBLICATIONS

European Search Report dated Jun. 25, 2009 in corresponding EP 08022086.3.

* cited by examiner

*Primary Examiner* — Gwendolyn Blackwell
(74) *Attorney, Agent, or Firm* — Faegre Baker Daniels LLP

(57) ABSTRACT

The invention concerns an anti-scratch coating on a substrate, comprising one or several anti-scratch means and a pH buffer system which has in a watery solution a pH value ranging from neutral to highly alkaline, especially a pH value ranging between app. 7 and app. 12, preferably a pH value ranging from neutral to slightly alkaline, in particular a pH value ranging between app. 7 and app. 9. It is also the objective of the invention to produce and use the anti-scratch coating.

12 Claims, 2 Drawing Sheets

ANTI-SCRATCH COATING, PROCEDURE FOR ITS PRODUCTION AND USE OF SAME

Figure 1:
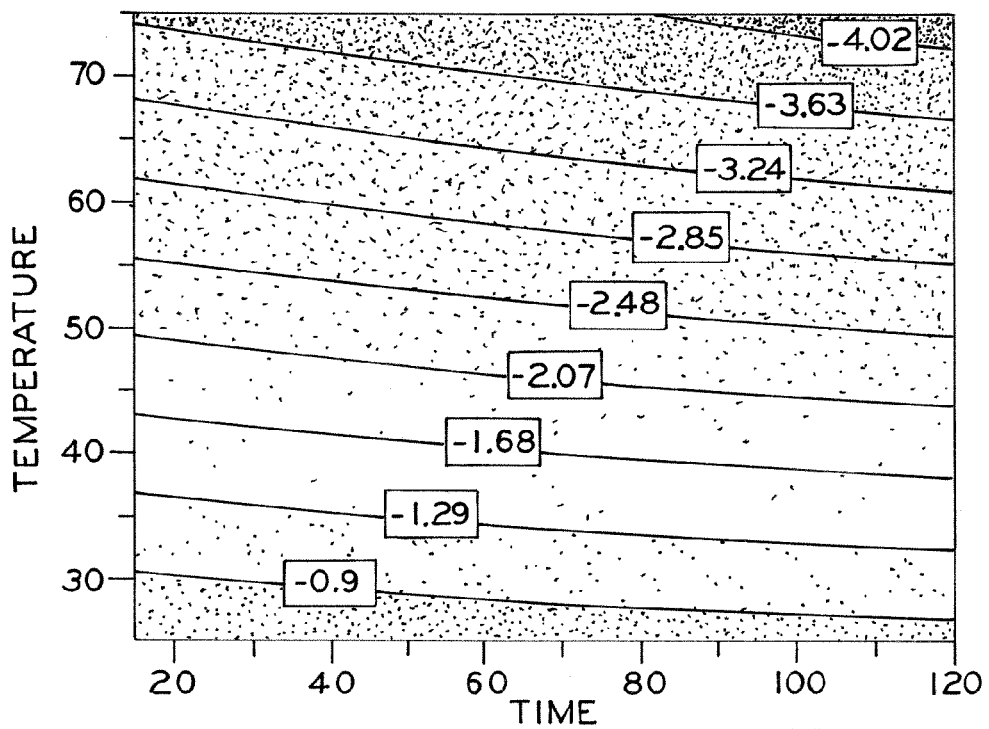

The invention concerns an anti-scratch coating, particularly involving semi-finished products, a method for its production and its application.

BACKGROUND OF THE INVENTION

In known fashion alkaline silicate glasses, in particular borosilicate glasses, are used for gas discharge lamps, as, for example, CCFL-(cold-cathode fluorescent lamp) or even EEFL-(external electrode fluorescent lamp)-gas discharge lamps. The main components of such glasses are $SiO_2$, $B_2O_3$, as well as alkali and alkaline earth oxides. Because of the relatively high content of, for example, between 10 and 20 percent by weight of $B_2O_3$ in the glass matrix, these glasses have a relatively poor chemical consistency toward acids and bases, as well as low hydrolytic consistency.

It is also known to subject the glass tubes to a washing process for the purpose of cleaning them before the actual production process of the lamps. On the one hand, this washing process serves the purpose to remove contamination which settled, for example, during the period of transporting on the outer and inner surface. On the other hand, it serves the purpose of removing possibly existing glass splinters. The washing process is performed with water using, if required, cleaning supplements.

This usually performed washing process has a number of disadvantages: Because of the poor chemical consistency of the glasses, it is possible that, during the washing process, the glass surface has a reaction to the washing solution, for example, a lixiviating reaction. This can result in dissolution of the glass, i.e., the glass is etched or completely dissolved, and components of the glass are dissolved. Although under normal circumstances, such as at room temperature and having a neutral pH value, the glass is only partially etched, such circumstances alter the form as well as the properties of the glass surface. Furthermore, an ion exchange can take place at the glass surface during which, for example, alkali ions from the glass can be dissolved and exchanged with protons ($H^+$). It is also possible that $B_2O_3$ is dissolved from the glass matrix.

The negative effects of these reactions of the washing solution on the glass appear especially during further processing of the glasses: During subsequent heat treatments, for example, a subsequent tempering step, for example, the so-called baking step (at maximum temperatures in the range of, for example, between app. 500° C. and app. 750° C., typically between 600° C. and 700° C.), during which the fluorescent layer is burned on the inner surface of the tube, results in shrinkage or compaction of the tube. In the context of the invention at hand, the term compaction refers to an irreversible local densification corresponding to a contraction of the material on molecular level. By dissolving components, such as alkali ions or $B_2O_3$, from the glass matrix, the network becomes coarsely meshed, as it were, so that the network tightens during the process of heating the tube.

This can result in form deformation, especially in a reduction of the tube length. This reduction of the tube can range between 0.5% and 10% or more. In worst case scenario it means that because of the tube reduction the tubes are useless for the intended purpose and have to be eliminated as waste.

Besides with glass, such adverse effects are expected to occur also with other materials.

Surprisingly, the inventors discovered that it is possible to considerably reduce or completely prevent this unwanted shrinkage by performing the washing process under precisely defined conditions, especially with a pH value ranging from neutral to slightly alkaline, i.e., between 7 and 9, preferably ranging between 7 and 8. A subsequent processor can therefore use directly as a finished product a washing solution with an adjusted pH value. It is also possible to use a washing solution in which the pH value in the range mentioned is subsequently adjusted, for example, by adding a pH buffer system in order to eliminate the adverse effects described. However, washing has the great disadvantage that the producer of the substrate, such as a glass manufacturer, has no influence on the proper and optimum adjustment of the pH value of the washing solution and has no possibility of controlling this production step with regard to quality control. However, improper performance of the washing process on the part of the subsequent processor can result in material defects for which the producer [of the substrate] can be blamed, accusing him of having provided defective material.

Accordingly, the invention at hand is based on the objective of preventing the disadvantages of prior art described above and to provide the possibility of minimizing the reaction of a washing substance in a washing process involving a material surface, or to control such reaction in a defined manner, for example, to process in a controlled way the shrinkage in the form of material reduction with subsequent temperature treatment in order to achieve on an average the best possible uniform change over a large number of batches. In this connection the control of the washing process should be performed in such a way that even a subsequent user would be able to perform the washing process in a controlled manner. Furthermore, the washing process should fulfill its original purpose of cleaning in a satisfying way the material surface.

DESCRIPTION OF THE INVENTION

According to the invention, the objective of the invention at hand is achieved by means of an anti-scratch coating on a substrate, comprising one or several anti-scratch means and a pH buffer system which has in a watery solution a pH value ranging from neutral to highly alkaline, especially a pH value ranging between app. 7 and app. 12, preferably a pH value ranging from neutral to slightly alkaline, in particular ranging between app. 7 and app. 9.

The invention at hand is based on the surprising finding that the unwanted effect of shrinkage can be reduced to a minimum, can be completely prevented or specifically adjusted if a washing process is performed under defined conditions, especially in a neutral to highly alkaline range, preferably in a neutral to slightly alkaline range, whereas the pH value adjustment can be easily controlled during the washing process by means of the composition of the invention-0based anti-scratch coating. During the washing process the pH value of the washing solution should range between 7 and 12, preferably between 7 and 9, especially preferable between 7 and 8. Besides a slightly alkaline range, it proved to be advantageous to extend the range also to a highly alkaline range. It proved to be especially advantageous if a pH value has been adjusted in this pH value since in this way the washing solution does not affect the surface of the substrate, for example, a glass, or affects the surface merely to a minor degree. According to the invention, it is especially advantageous if the pH value is maintained at a constant level throughout the entire washing process. For this reason it proved to be especially advantageous to use buffer systems. Therefore the invention-based anti-scratch coating comprises a buffer system.

By adjusting the pH value during the washing process through a specific selection of the composition of the anti-scratch coating, it is possible to considerably reduce wastage and increase the yield of substrate, particularly involving semi-finished products, as, for example, in the case of glass, which is especially cost-effective with regard to substrates produced for large scale industry.

For this reason, the anti-scratch coating of the invention fulfills several functions simultaneously: It provided adequate protection against surface damage of a substrate, especially a semi-finished product which is subject to further processing, and prevents possible scratching during the time of transporting and storage. For a subsequent washing process using a watery solution, the anti-scratch coating of the invention also provides a pH value which results from the release of the pH buffer contained in the anti-scratch coating, resulting in an adjustment of a controlled, optimum pH value of the washing solution and, consequently, prevents the disadvantageous shrinking effect.

The invention-based anti-scratch coating can be water soluble or insoluble in water. In the context of the invention, the invention-based anti-scratch coating is described as insoluble in water if the component of the coating providing scratch resistance is not soluble in water or if it is soluble merely to a minor degree.

In order to provide the anti-scratch coating with respective properties of scratch resistance, anti-scratch means are used. Any compound or mixture of compound providing scratch resistance can be used as anti-scratch means. That means that the anti-scratch means to be used in the anti-scratch coating of the invention are not specifically restricted. It is possible to use any known compound having anti-scratch properties. To be considered are several compounds, as, for example, lacquer coatings, particularly hard finish coatings, different synthetic materials having differing scratch, shock and abrasion resistance, sol-gel coatings and many other coatings suitable to be used as anti-scratch means for the invention-based anti-scratch coating. Subsequently a description is provided for especially preferred, but not restrictive, examples for anti-scratch coatings:

Disponil SMO 120 (Agnique SMS-20):
Composition: a polyoxyethylene(20)-sorbitan monooleate of the chemical formula $C_{64}H_{124}O_{26}$, which is also known under the name of Polysorbate-80. It is a polyoxyethylene sorbitan monooleate (commercial name also Tween® 80, which is used as nonionic surfactant in cosmetics, drugs, animal feed and especially as emulsifying agent in foods. It is a viscous, water soluble, yellow liquid which is derived from sorbitol and oleic acid. The hydrophilic groups of this molecule are polyether, polymers of a total of 20 ethylene oxides. It is mainly used in foods, specifically as emulsifying and stabilizing agent for foods. It is frequently used in ice cream in order to prevent that milk proteins completely surround the adipic drips, whereas Disponil SMO 120 forms chains and network structures which retain air in the mixture. In this way a stronger structure is formed, resulting in the fact that the ice cream maintains its shape during the process of melting. It is registered in the EU as food additive under the number E 433. Disponil SMO 120 form the base for an anti-scratch coating containing, for example, up to 98% Disponil SMO 120 and 2 to 3% water. The HLB value (HLB: hydrophilic lipophilic balance) of Disponil SMO 120 amounts to 15. Such coating is dissolved in hot water and can therefore be easily removed.

RP40:
Composition: 24% dispersion of "modified" polyethylene wax in water (particle size <1 µm) can form the base for an anti-scratch coating. Coating having RP40 can be removed by means of a washing process with hot water. RP40 is already used as so-called cold-end-coating system in the container glass industry.

LIOMIX GL:
Composition: 29.5% secondary fatty alcohol ($C_{12}$-$C_{14}$)-polyglycol ether, 70% water and 0.5% stabilizer form the base for an anti-scratch coating. LIOMIX GL is also already in use as cold-end-coating system in the container glass industry and is known for its low foaming effect (HLB 6.3).

It is certainly possible to use any other scratch-resistant compounds or compositions.

According to the invention, the anti-scratch coating comprises a pH buffer system. According to the invention, a pH buffer system refers to a buffer which is available in the anti-scratch coating as solid matter and which is dissolved from the coating by means of a washing process with water and which, in this way, adjusts in a suitable range the pH value in the washing solution.

Experts know pH buffer systems and they are described in detail in standard works of the chemical industry. However, the following buffer systems proved to be especially advantageous: phosphate buffer, such as $KH_2PO_4$/NaOH (pH range 5.8-8.0) or $KH_2PO_4$/$Na_2HPO_4$ (pH between 5.4 and 7.8.) and many other buffer systems known to experts. By adjusting the proportions of the components of the buffer solution, any desired pH value can be adjusted in the possible range. This is exemplified by the following table:

| Usable pH range | A | x ml B | Adjusted PH value (buffer mixture of 50 ml A + x ml B) |
|---|---|---|---|
| 5.8-8.0 | 0.1m $KH_2PO_4$ | 3.6 m. 0.1m NaOH | 5.8 |
| 5.8-8.0 | 0.1m $KH_2PO_4$ | 46.1 ml 0.1m NaOH | 8.0 |

Final volume of the mixtures=100 ml buffer solution

The above systems represent merely exemplary pH systems; experts are familiar with other systems.

The pH buffer systems can be selected in such a way that these can be comprised as solid matter in the anti-scratch coating and are released only after water is added in order to adjust the desired pH value in the water.

Therefore, according to the invention, the pH value no longer has to be adjusted in the washing solution by adding further compounds. Instead, the pH value is automatically adjusted in the desired range. Consequently, the producer can provide the pH value in the washing solution by means of the composition of the anti-scratch coating. It does not have to be adjusted by the subsequent processor. The producer is able to predefine and adjust in controlled fashion the pH value and thus a possible acid and/or hydrolytic and/or alkaline attack of the substrate material during further processing in watery solutions. In this way it is possible to reduce wastage resulting from improper treatment, such as an incorrectly adjusted pH value.

A further relatively critical condition during the washing process is the washing temperature used for washing. Preferably the washing temperature should range from above app. 0° C. to app. 90° C., preferably between app. 20° C. and <80° C. Since surprisingly it has become evident that it is advantageous to keep the washing temperature as low as possible, a washing temperature kept in the range of room temperature is in any case uncritical, allowing any subsequent processor of a substrate to maintain this condition. If the temperature range described is taken into consideration, the material surface is not being attacked or, if at all, it will be attacked merely to a minor degree.

However, with regard to the shrinkage effect of merely subordinate importance for the washing process of a substrate is the duration or time of washing, that is, how long is the substrate exposed to the washing medium. In order to achieve adequate cleaning efficiency and, at the same time, attain only minor shrinkage, it is especially advantageous to perform the washing process at low temperatures and longer periods or at high temperatures and shorter periods, whereas the latter is less preferable. A low temperature refers to a temperature selected from a lower range of the specified range, a higher temperature refers to a temperature selected from a higher range of the specified range.

It proved to be especially advantageous if the anti-scratch coating comprises one or several additives featuring cleaning efficiency. Cleaning additives to be used can consist of any kind of compounds supporting a cleaning process; in particular these are compounds which reduce the surface tension of the water, as well as compounds having a functional hydrophilic an hydrophobic group, such as surfactants (anionic, cationic, neutral systems), particularly soaps. It proved to be especially advantageous, if the compounds supporting the cleaning process of the substrate to be treated also have a neutral to highly alkaline pH value, preferably a neutral to slightly alkaline pH value, or even function themselves as pH buffer.

Preferred cleaning additives are, for example, anionic surfactants, such as alkylbenzene sulfonates, alkane sulfonates, fatty alcohol sulfonates, fatty alcohol ether sulfonates, alkyl phosphates, alkyl ether phosphates, and soaps in the form of sodium and potassium salts of higher fatty acids. Preferred nonionic surfactants are, for example, fatty alcohol ethoxylates, alkylphenol ethoxylates, fatty amine ethoxylates, fatty acid ester ethoxylates, alkanolamides and aminoxides. Preferred cationic surfactants are, for example, alkylammonium compounds or imidazolinium compounds, and preferred amphoteric surfactants are, for example, sulfobetaine and taurine.

Preferably the cleaning additive(s) are available at an amount of between app. 0.1 and app. 20 percent by weight, preferably between app. 0.5 and 10.0 percent by weight, especially preferable between 1 and 5 percent by weight.

The term "app." [approximately] is to be seen in the context of a numerical value or range of an up to 10% higher or lower value, preferably an up to 20% higher or lower value. All interim values of a range shall also be explicitly disclosed.

In an especially preferred embodiment, the coating comprises also an indicator which shows when the pH system has been used up or when the washing solution needs to be exchanged, provided it is a matter of a discontinuous washing process, i.e., if the washing medium does not have to be continuously exchanged. Such indicators concern compounds which are included in the anti-scratch coating as solid matter and which have in watery solution a transition point which is available during the transition from alkaline to neutral or acidic environment. It is also possible to use mixtures of indicators. For example: litmus, bromine thymol blue, phenolphthalein or the like.

The indicator is available in the anti-scratch coating in relatively small amounts, for example amounts of a maximum of 1%, preferably <0.1% and <0.01% are already sufficient.

According to a further advantageous embodiment, the indicator is simultaneously a component of the pH buffer system or the cleaning additives.

In addition to the pH buffer system, the anti-scratch coating can provide for the washing process also a cleaning efficiency and, if necessary, an indicator function.

According to a further advantageous embodiment of the invention, the invention-based anti-scratch coating can comprise also neutral salts in order to increase the ionic concentration in the washing medium. These are usual salts which react neither with the substrate nor with a component of the washing medium. These include, for example: NaCl, $Na_2SO_4$, $CaCl_2$, KCl, $K_2SO_4$, KBr, and others. Preferably, the neutral salts are available in the anti-scratch coating in amounts of app. between 0.5 and app. 5 percent by weight.

It is also preferred that the components of the anti-scratch coating are adjusted in such a way that no unwanted reactions take place, as, for example, deficiencies or the like of components among each other or with components which are possibly added by the subsequent processor of the washing solution. This depends on the components used and can be determined by the expert by means of a few exploratory tests.

According to the invention, the substrate which is applied to the invention-based anti-scratch coating is not specifically restricted. It is possible to use any kind of substrate derived from any kind of material in any form, provided an adhesion can be formed with an anti-scratch coating. For example, the substrate can be selected from glass, metal, synthetic material, in particular objects of any form, comprising or consisting therefrom. Especially preferred is glass, even more preferred are glass tubes and particularly preferred are such lamp glass tubes which are intended for use in fluorescent lamps, particularly for background lighting.

According to an especially preferred embodiment, an object is used as substrate which comprises or consists of glass, in particular in the form of a glass tube. In the context of the invention, the glass of the glass tube is not specifically restricted. Especially preferred for the glass tubes are glasses based on borosilicate glass or soda-lime glass. All known glasses shall be included.

Glasses for which the method described is especially advantageous, for example, have one of the following glass compositions:
as well as Rh, Hf, Ta, W, Re, Os, Ir, Pt, La, Pr, Nd, Sm, Eu, Gd, Tb, Dy, Ho, Er, Tm, Yb, Lu in oxidic form in amounts of between 0 and 5 percent by weight

| | | |
|---|---|---|
| $SiO_2$ | 50-70 | percent by weight |
| $B_2O_3$ | 5-20 | percent by weight |
| $Al_2O_3$ | 1-13 | percent by weight |
| $Li_2O$ | 0-5 | percent by weight |
| $Na_2O$ | 0-10 | percent by weight |
| $K_2O$ | 0-10 | percent by weight |
| $Li2O + Na2O + K2O$ has | 3-15 | percent by weight |
| MgO | 0-5 | percent by weight |
| CaO | 0-10 | percent by weight |
| SrO | 0-5 | percent by weight |
| BaO | 0-15 | percent by weight |
| $TiO_2$ | 0-10 | percent by weight |
| preferably | >0.5-10 | percent by weight |
| in particular has | >0.5-5 | percent by weight |
| $ZrO_2$ | 0-3 | percent by weight |
| $CeO_2$ | 0-5 | percent by weight |
| $Fe_2O_3$ | 0-1 | percent by weight |
| $WO_3$ | 0-3 | percent by weight |
| $Bi_2O_3$ | 0-3 | percent by weight |
| $MoO_3$ | 0-3 | percent by weight |
| ZnO | 0-5 | percent by weight |
| $SnO_2$ | 0-2 | percent by weight | comprising, if necessary, refining means in the usual concentrations, in particular selected from chlorides, sulfates, $As_2O_3$ and/or $Sb_2O_3$. Especially preferred is the use of $SnO_2$ for high temperature refining.

In addition, also so-called soda-lime glasses are preferred, for example, having the following compositions:

| | |
|---|---|
| $SiO_2$ | 50-80 percent by weight |
| $B_2O_3$ | 0-5 percent by weight |
| $Al_2O_3$ | 0-5 percent by weight |
| $Li_2O$ | 0-5 percent by weight |
| $Na_2O$ | 0-10 percent by weight |
| $K_2O$ | 0-10 percent by weight |
| $Li_2O + Na_2O + K_2O$ has | 3-20 percent by weight |
| MgO | 0-5 percent by weight |
| CaO | 0-10 percent by weight |
| SrO | 0-5 percent by weight |
| BaO | 0-15 percent by weight |
| MgO + CaO + SrO + BaO | 3-20 percent by weight |
| $TiO_2$ | 0-10 percent by weight |
| preferably | >0.5-10 percent by weight |
| in particular has | >0.5-5 percent by weight |
| $ZrO_2$ | 0-3 percent by weight |
| $CeO_2$ | 0-5 percent by weight |
| $Fe_2O_3$ | 0-1 percent by weight |
| $WO_3$ | 0-3 percent by weight |
| $Bi_2O_3$ | 0-3 percent by weight |
| $MoO_3$ | 0-3 percent by weight |
| ZnO | 0-5 percent by weight |
| $SnO_2$ | 0-2 percent by weight | as well as Rh, Hf, Ta, W, Re, Os, Ir, Pt, La, Pr, Nd, Sm, Eu, Gd, Th, Dy, Ho, Er, Tm, Yb, Lu in oxidic form in amounts of between 0 and 5 percent by weight comprising, if necessary, refining means in the usual concentrations, in particular selected from chlorides, sulfates, $As_2O_3$ and/or $Sb_2O_3$. Especially preferred is the use of $SnO_2$ for high temperature refining.

With the glass compositions used it can be advantageous if ceroxide and tin oxide are available at the same time. In this way it is possible to eliminate by means of tin oxide possible discoloration resulting from high amounts of ceroxide.

According to the invention, the form of the substrate is also not specifically restricted. For the preferably used glass tubes, any practical profile, preferably in a lamp, can be used. Usual profiles of a lamp are adjusted to the spatial conditions, for example, in the case of background lighting. Preferably round, oval, rectangular or flat profiles (for example Planon® by Osram) are used, especially preferred are profiles which are used in lamps used for background lighting, such as flat rectangular profiles.

The glass tubes preferably used according to the invention can be appropriately processed to be used as casing for fluorescent lamps, even more preferably for miniature fluorescent lamps. For this purpose the glass tubes are preferably subjected to temperature treatment according to the washing process described. For example, this involves a tempering step, for example, the so-called baking process, whereas maximum temperatures are used in the range of, for example, between app. 500° C. and app. 750° C., typically between 600° C. and 700° C., during which a fluorescent layer is burned on the inside of the tube. The fluorescent lamps that can be produced from the glass tubes can preferably be used for background lighting, for example of flat screens (so-called backlights), in particular LCD-TFT displays. For this application, such lamps have very small dimensions and accordingly the lamp glass is preferably extremely thin. For example, the glass tube can be tubular, whereas preferably the diameter comprises <1.0 cm, especially preferable <0.8 cm, particularly preferable <0.7 cm, even more preferable <0.5 cm. The wall thickness of the tubular glass casing comprises preferably <1 mm. In an alternative embodiment, the glass tube of the lamp can be a flat glass having a thickness of <1 cm. Preferred displays as well as monitors are so-called flat displays, which are used in Laptops, especially flat backlight arrangements.

Preferably, the producible fluorescent lamps are miniature backlight lamps. The lamps can be subdivided into a center part, which is preferably largely transparent and available in the form of a glass casing, as well as two end parts, which are provided with respective connections by inserting metal or metal alloy wires. It is possible to fuse in a tempering step the metal or metal wires with the glass casing. The metal or metal alloy wires are an electrode feed-throughs and/or electrodes. Preferably these electrode feed-throughs consist of Wolfram or molybdenum metal or Kovar alloys or Dumet alloys. The thermal linear extension (CTE) of the glass casing largely corresponds with the linear extension (CTE) of the electrode feed-throughs so that no voltage or only defined and specifically used voltage occurs in the range of the feed-throughs. Especially preferred backlight lamps are EEFLs (external electrode fluorescent lamp) without electrode feed-through since with electrodeless EEFL backlight coupling in occurs by means of electric fields. There are also CCFL systems (cold-cathode fluorescent lamp) known, whereas plasma ignition takes place via internal electrodes.

It is also the objective of the invention to provide a method to produce the invention-based anti-scratch coating by means of the following steps:
  to spray on a watery mixture comprising at least an anti-scratch means, a pH buffer system, as well as further optional additives, selected from cleaning additives, indicators and neutral salts in water, on a substrate by means of a vaporizer and
  to dry the mixture, obtaining an anti-scratch coating.

The watery mixture refers to a mixture consisting of components of the anti-scratch coating in water. This can involve a watery solution, suspension or dispersion, depending on the components selected. The obligatory and optional components of the anti-scratch coating have already been described in detail.

Preferably, the spraying on is performed by means of a customary vaporizer. However, it is also possible to use a different application method for a layer, which application method is based on applying a liquid system to a surface.

Furthermore, the invention at hand refers to the use of the invention-based anti-scratch coating for cleaning a substrate, which involves
  to apply an invention-based anti-scratch coating to a substrate
  to subject the substrate to which the anti-scratch coating has been applied to a washing process, which involves
  to put the substrate in water, dissolving the additives from the anti-scratch coating or dissolving the anti-scratch coating in water, whereas a pH value is adjusted in the range between 7 and 12, preferably in the range between 7 and 9, especially preferred in the range between 7 and 8, and
  to remove the substrate.

An especially preferred embodiment of this invention consists of the fact that a substrate to which the invention-based anti-scratch coating has been applied is placed in pure water without additives and the anti-scratch coating releases the substances required for the washing process. This is a matter of the pH buffer system and optional further additives, such as cleaning additives, indicators, neutral salts and the like.

As has been already mentioned, the washing temperature is relatively uncritical, whereas it is adjusted preferably between above app. 0° C. and app. 90° C., particularly preferred between app. 20° C. and <80° C. It is especially preferred to adjust the washing temperature at a temperature range of between app. 20° C. and <70° C., particularly preferred between app. 25° C. and <50° C.

The usual washing period for a substrate amounts to between app. 10 and app. 120 minutes. However, in particular cases it can be considerably higher or lower.

According to a further embodiment, one or several complexing agents can be added to the washing medium, i.e., the water, in order to coordinate, for example, dissolved ions, such as, alkalines, alkaline earths, and thus bond them and prevent a reaction with the substrate or components of the washing medium. Appropriate complexing agents are described in the chemical literature, for example, it can concern EDTA, poly(hydroxycarboxylates), crown ether, or others.

The washing medium is water, preferably without any additives, in which the components of the anti-scratch coating are dissolved, resulting in a washing solution which features cleaning efficiency. It is also possible that during the washing process the anti-scratch coating is completely dissolved in water so that it is removed simultaneously with the washing process. This is a matter of a temporary layer. However, it is also possible to use a permanent layer which remains as anti-scratch coating on the substrate after the washing process and which continues to protect the layer against scratches.

It is especially preferred if the washing process is performed in a container of suitable size filled with water, preferably without additives. It is especially preferred if the container used is an ultrasonic bath in order to improve cleaning efficiency.

Preferred substrates are semi-finished products, especially objects containing or consisting of glass, synthetic material, as, for example, glass tubes.

The preceding descriptions regarding anti-scratch coating apply to the invention-based use.

Subsequently, the invention at hand is explained by means of an example which should exemplify the invention-based theory but not restrict it.

Embodiment

Glass tubes have been produced using the following borosilicate glass composition:

|  | Embodiment 1 |
| --- | --- |
| $SiO_2$ | 66 |
| $Al_2O_3$ | 2.5 |
| $B_2O_3$ | 18 |
| $Li_2O$ | 0.5 |
| $Na_2O$ | 0.5 |
| $K_2O$ | 7.5 |
| MgO |  |
| CaO |  |
| SrO |  |
| BaO |  |
| ZnO | 0.5 |
| $ZrO_2$ |  |
| $As_2O_3$ |  |
| $Sb_2O_3$ | 0.5 |
| $Fe_2O_3$ |  |
| $TiO_2$ | 4 |
| Total | 100 |

The geometry used for the tubes is as follows:

| | |
| --- | --- |
| Outer diameter: | 3.4 mm |
| Inner diameter: | 2.4 mm |
| Wall thickness: | 0.5 mm and |
| Length of tube: | 500 mm. |

Figure 2:
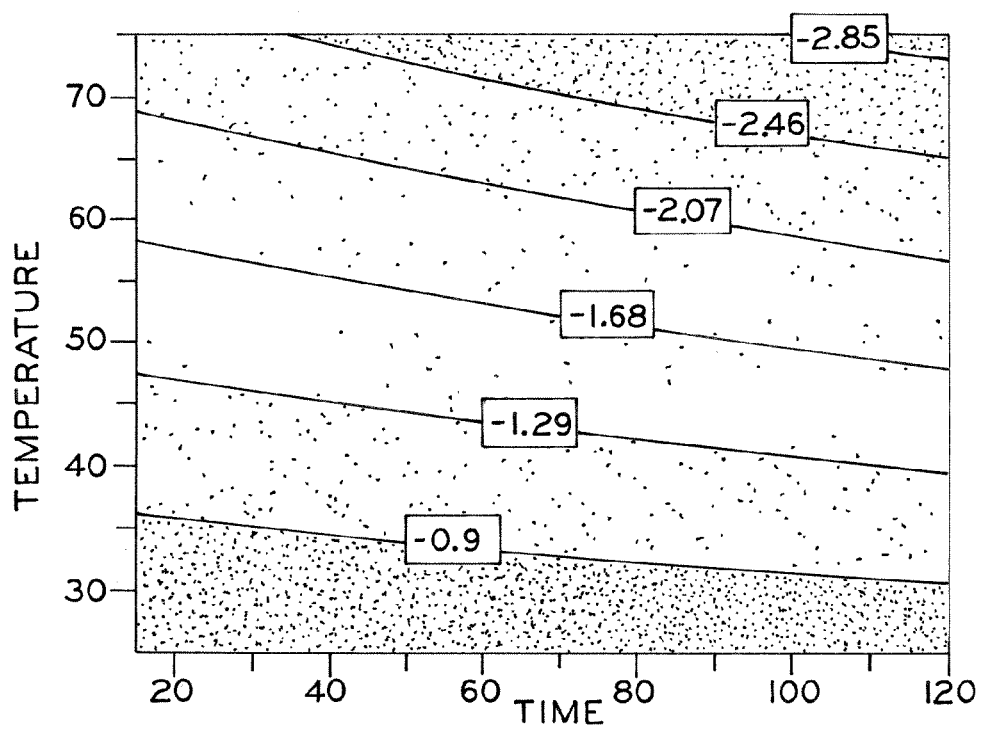
Figure 3:
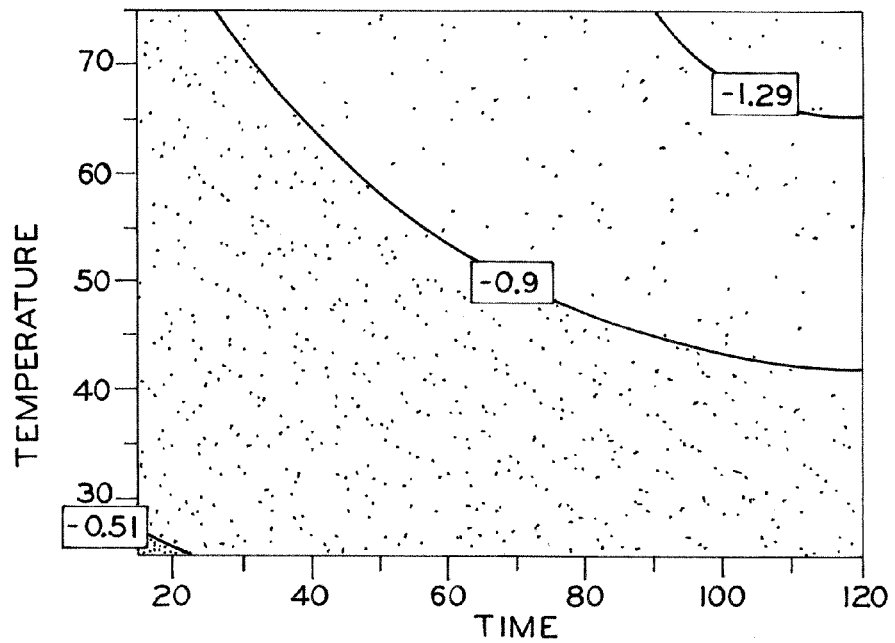
Figure 4:
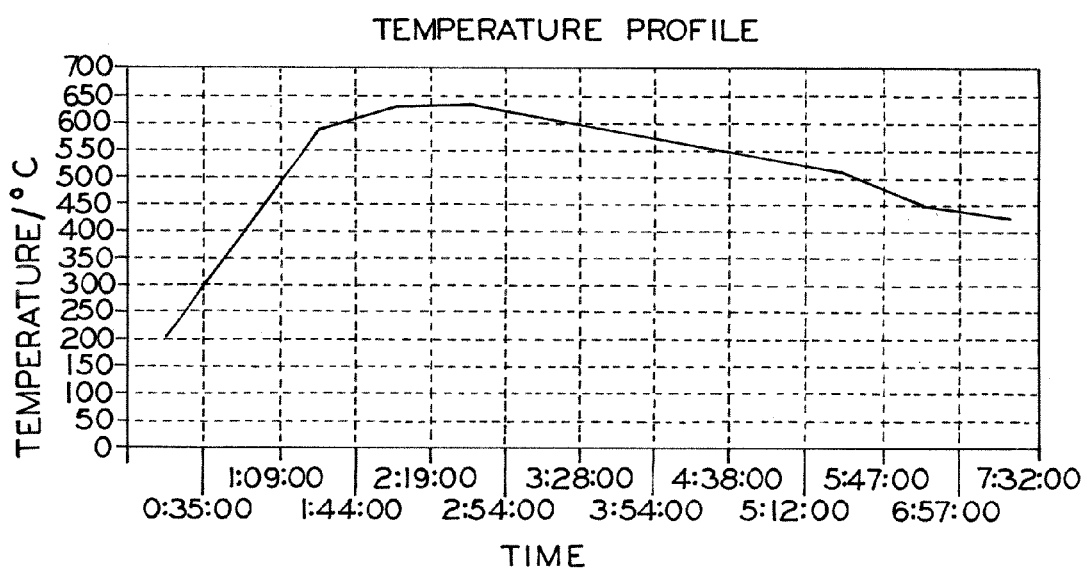

Glass tubes having the above composition and the dimension specified were subjected to a cleaning process in order to demonstrate the effect on the glass tubes. In this connection the shrinkage of the respective glass tube in mm was tested for different pH values, depending on the washing period and washing temperature. The enclosed FIGS. 1 through 3 describe the results of the tests. The figures show:

FIG. 1 shrinkage of the glass tube in mm with a pH value of 4.5, depending on the washing period and washing temperature;

FIG. 2 shrinkage of the glass tube in mm with a pH value of 7, depending on the washing period and washing temperature;

FIG. 3 shrinkage of the glass tube in mm with a pH value of 9, depending on the washing period and washing temperature; and FIG. 4 an exemplary temperature-time-program involving a baking process.

FIG. 1 shows the washing process at a pH value of 4.5. The pH value lies outside of the preferred pH range and has been adjusted too acidic, resulting in clear increase in shrinkage in higher temperature ranges. Already above 45° C. there is a clearly noticeable adverse effect on the glass tube which results in deformation of the glass tube which renders the glass useless for its intended purpose in a lamp used for background lighting.

FIG. 2 shows a washing process, performed at a pH value of 7. The areas involving the different shrinkage shown in FIG. 1 are clearly extended, allowing for temperature treatment up to temperatures which lie preferably below 70° C.

FIG. 3 shows a washing process, performed at a pH value of 9. As shown in FIG. 3, the pH value ranging between 8 and 9 is especially advantageous. Even during long treatment periods of 120 minutes, up to above 70° C. no considerable shrinkage takes place, resulting in the fact that the washed glasses are practically not subject to deformation.

FIG. 4 shows an exemplary temperature-time-program involving a baking process. It is certainly possible to adjust other program executions.

The provision of the invention-based anti-scratch coating makes it possible to eliminate adverse effects on glass tubes mentioned above.

Consequently, the invention at hand provides for the first time an anti-scratch coating which combines several functions. In this way, besides providing protection against scratches, it is also possible to clearly reduce or completely eliminate shrinkage, due to a washing process and subsequent temperature treatment of semi-finished products. This results in a considerable reduction of wastage with regard to the production of semi-finished products, which, in turn, considerably increases cost-effectiveness.

The invention claimed is:

1. A glass substrate having a water-soluble anti-scratch coating, said coating comprising:
    a water soluble anti-scratch component; and
    a buffer system incorporated in solid form in said coating, said buffer system capable of releasing from said coating to provide a pH between 7 and 12 in an aqueous solution.

2. The glass substrate of claim 1, wherein said buffer system is capable of releasing from said coating to provide a pH between 7 and 9 in an aqueous solution.

3. The glass substrate of claim 1, wherein said buffer system consists of one or more phosphate buffers in solid form.

4. The glass substrate of claim 1, wherein said anti-scratch coating includes at least one additive selected from the group consisting of:
    at least one solid surfactant;
    at least one high pH indicator; and
    at least one neutral salt.

5. The glass substrate of claim 4, wherein:
    said at least one surfactant, if present, is present in an amount selected from the group consisting of between 0.1 and 20 percent by weight, between 0.5 and 10.0 percent by weight, and between 1 and 5 percent by weight;
    said at least one high pH indicator, if present, is present in a maximum amount selected from the group consisting of 1 percent by weight, 0.1 percent by weight, and 0.01 percent by weight; and
    said at least on neutral salt, if present, is present in an amount of between 0.5 and 5 percent by weight.

6. The glass substrate of claim 1, wherein said anti-scratch coating further comprises at least one compound having a neutral to highly alkaline pH value, said compound selected from the group consisting of anionic surfactants, cationic surfactants, non ionic surfactants, and amphoteric surfactants.

7. The glass substrate of claim 1, wherein said glass substrate is a glass tube.

8. The glass substrate of claim 1, wherein said substrate is selected from the group consisting of borosilicate glass and soda-lime glass;
    said borosilicate glass having the following composition:

| | |
|---|---|
| $SiO_2$ | 50-70 percent by weight |
| $B_2O_3$ | 5-20 percent by weight |
| $Al_2O_3$ | 1-13 percent by weight |
| $Li_2O$ | 0-5 percent by weight |
| $Na_2O$ | 0-10 percent by weight |
| $K_2O$ | 0-10 percent by weight |
| $Li_2O + Na_2O + K_2O$ | 3-15 percent by weight |
| MgO | 0-5 percent by weight |
| CaO | 0-10 percent by weight |
| SrO | 0-5 percent by weight |
| BaO | 0-15 percent by weight |
| $TiO_2$ | 0-10 percent by weight |
| preferably | >0.5-10 percent by weight |
| in particular | >0.5-5 percent by weight |
| $ZrO_2$ | 0-3 percent by weight |
| $CeO_2$ | 0-5 percent by weight |
| $Fe_2O_3$ | 0-1 percent by weight |
| $WO_3$ | 0-3 percent by weight |
| $Bi_2O_3$ | 0-3 percent by weight |
| $MoO_3$ | 0-3 percent by weight |
| ZnO | 0-5 percent by weight |
| $SnO_2$ | 0-2 percent by weight | as well as Rh, Hf Ta, W, Re, Os, Ir, Pt, La, Pr, Nd, Sm, Eu, Gd, Tb, Dy, Ho, Er, Tm, Yb, Lu in oxidic form in amounts of between 0 and 5 percent by weight, and also comprising, if necessary, refining means in the usual concentrations, in particular selected from chlorides, sulfates, $As_2O_3$ and/or $Sb_2O_3$; and
    said soda-lime glass having the following composition:

| | |
|---|---|
| $SiO_2$ | 50-80 percent by weight |
| $B_2O_3$ | 0-5 percent by weight |
| $Al_2O_3$ | 0-5 percent by weight |
| $Li_2O$ | 0-5 percent by weight |
| $Na_2O$ | 0-10 percent by weight |
| $K_2O$ | 0-10 percent by weight |
| $Li_2O + Na_2O + K_2O$ | 3-20 percent by weight |
| MgO | 0-5 percent by weight |
| CaO | 0-10 percent by weight |
| SrO | 0-5 percent by weight |
| BaO | 0-15 percent by weight |
| MgO + CaO + SrO + BaO | 3-20 percent by weight |
| $TiO_2$ | 0-10 percent by weight |
| preferably | >0.5-10 percent by weight |
| in particular | >0.5-5 percent by weight |
| $ZrO_2$ | 0-3 percent by weight |
| $CeO_2$ | 0-5 percent by weight |
| $Fe_2O_3$ | 0-1 percent by weight |
| $WO_3$ | 0-3 percent by weight |
| $Bi_2O_3$ | 0-3 percent by weight |
| $MoO_3$ | 0-3 percent by weight |
| ZnO | 0-5 percent by weight |
| $SnO_2$ | 0-2 percent by weight | as well as Rh, Hf, Ta, W, Re, Os, Ir, Pt, La, Pr, Nd, Sm, Eu, Gd, Tb, Dy, Ho, Er, Tm, Yb, Lu in oxidic form in amounts of between 0 and 5 percent by weight.

9. A method of temporarily protecting a glass substrate, comprising the steps of:
    providing a glass substrate having a water soluble anti-scratch coating, the coating including a water soluble anti-scratch component and a buffer system incorporated in solid form in the coating, the buffer system capable of releasing from the coating to provide a pH between 7 and 12 in water;
    subjecting the glass substrate to a washing process in water wherein the buffer system provides a pH between 7 and 12 and the coating is removed from the glass substrate; and
    removing the glass substrate from the water after a period of between 10 and 120 minutes.

10. The method of claim 9, wherein the temperature of the water is adjusted to be in a range selected from the group consisting of between 0° C. and 90° C., between 20° C. and 80° C., betw1een 20° C. and 70° C., and between 25° C. and 50° C.

11. The method of claim 9 wherein, in said providing step, the glass substrate is a glass tube.

12. The method of claim 9 wherein, in said providing step, the glass substrate is selected from the group consisting of borosilicate glass and soda-lime glass:
    the borosilicate glass having the following composition:

| | |
|---|---|
| $SiO_2$ | 50-70 percent by weight |
| $B_2O_3$ | 5-20 percent by weight |
| $Al_2O_3$ | 1-13 percent by weight |
| $Li_2O$ | 0-5 percent by weight |
| $Na_2O$ | 0-10 percent by weight |
| $K_2O$ | 0-10 percent by weight |
| $Li_2O + Na_2O + K_2O$ | 3-15 percent by weight |
| MgO | 0-5 percent by weight |
| CaO | 0-10 percent by weight |
| SrO | 0-5 percent by weight |

| | |
|---|---|
| BaO | 0-15 percent by weight |
| TiO$_2$ | 0-10 percent by weight |
| preferably | >0.5-10 percent by weight |
| in particular | >0.5-5 percent by weight |
| ZrO$_2$ | 0-3 percent by weight |
| CeO$_2$ | 0-5 percent by weight |
| Fe$_2$O$_3$ | 0-1 percent by weight |
| WO$_3$ | 0-3 percent by weight |
| Bi$_2$O$_3$ | 0-3 percent by weight |
| MoO$_3$ | 0-3 percent by weight |
| ZnO | 0-5 percent by weight |
| SnO$_2$ | 0-2 percent by weight | as well as Rh, Hf, Ta, W, Re, Os, Ir, Pt, La, Pr, Nd. Sm, Eu, Gd, Tb, Dy, Ho, Er, Tm, Yb, Lu in oxidic form in amounts of between 0 and 5 percent by weight, and also comprising, if necessary, refining means in the usual concentrations, in particular selected from chlorides, sulfates, As$_2$O$_3$ and/or Sb$_2$O$_3$; and the soda-lime glass has the following composition:

| | |
|---|---|
| SiO$_2$ | 50-80 percent by weight |
| B$_2$O$_3$ | 0-5 percent by weight |
| Al$_2$O$_3$ | 0-5 percent by weight |
| Li$_2$O | 0-5 percent by weight |
| Na$_2$O | 0-10 percent by weight |
| K$_2$O | 0-10 percent by weight |
| Li$_2$O + Na$_2$O + K$_2$O | 3-20 percent by weight |
| MgO | 0-5 percent by weight |
| CaO | 0-10 percent by weight |
| SrO | 0-5 percent by weight |
| MgO + CaO + SrO + BaO | 3-20 percent by weight |
| BaO | 0-15 percent by weight |
| TiO$_2$ | 0-10 percent by weight |
| preferably | >0.5-10 percent by weight |
| in particular | >0.5-5 percent by weight |
| ZrO$_2$ | 0-3 percent by weight |
| CeO$_2$ | 0-5 percent by weight |
| Fe$_2$O$_3$ | 0-1 percent by weight |
| WO$_3$ | 0-3 percent by weight |
| Bi$_2$O$_3$ | 0-3 percent by weight |
| MoO$_3$ | 0-3 percent by weight |
| ZnO | 0-5 percent by weight |
| SnO$_2$ | 0-2 percent by weight | as well as Rh, Hf, Ta, W, Re, Os, Ir, Pt, La, Pr, Nd, Sm, Eu, Gd, Tb, Dy, Ho, Er, Tm. Yb, Lu in oxidic form in amounts of between 0 and 5 percent by weight.

* * * * *